United States Patent
Xu et al.

(10) Patent No.: US 10,732,424 B2
(45) Date of Patent: Aug. 4, 2020

(54) INSPECTION-BEAM SHAPING ON A SAMPLE SURFACE AT AN OBLIQUE ANGLE OF INCIDENCE

(71) Applicant: KLA-Tencor Corporation, Milpitas, CA (US)

(72) Inventors: Zhiwei Xu, Sunnyvale, CA (US); Chunsheng Huang, San Jose, CA (US); Qing Li, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/258,543

(22) Filed: Jan. 26, 2019

(65) Prior Publication Data
US 2019/0250414 A1    Aug. 15, 2019

Related U.S. Application Data

(60) Provisional application No. 62/631,128, filed on Feb. 15, 2018.

(51) Int. Cl.
| | | |
|---|---|---|
| G02B 27/09 | (2006.01) | |
| G01N 21/01 | (2006.01) | |
| G01N 21/95 | (2006.01) | |

(52) U.S. Cl.
CPC ......... *G02B 27/0955* (2013.01); *G01N 21/01* (2013.01); *G01N 21/9501* (2013.01); *G02B 27/0944* (2013.01); *G01N 2021/0106* (2013.01); *G01N 2201/063* (2013.01)

(58) Field of Classification Search
CPC ........ G01N 21/00; G01N 21/84; G01N 21/95; G01N 21/9501; G02B 27/00; G02B 27/0101; G02B 27/09; G02B 27/0927; G02B 27/0944; G02B 27/0955
See application file for complete search history.

(56) References Cited

U.S. PATENT DOCUMENTS

| | | | |
|---|---|---|---|
| 9,625,380 B2 | 4/2017 | Mukoh et al. | |
| 2005/0024632 A1 | 2/2005 | Plemmons et al. | |
| 2008/0130468 A1* | 6/2008 | Nishioka | G11B 7/1353 369/112.05 |
| 2011/0051132 A1 | 3/2011 | Petrenko et al. | |
| 2013/0016346 A1* | 1/2013 | Romanovsky | G01N 21/8851 356/237.5 |
| 2014/0139829 A1 | 5/2014 | Wolters et al. | |

FOREIGN PATENT DOCUMENTS

EP    1061359 A2    12/2000

OTHER PUBLICATIONS

Adriaan Hendriks et al., "The Generation of Flat-Top Beams by Complex Amplitude Modulation with a Phase-Only Spatial Light Modulator," Proc. of SPIE vol. 8490, 849006-1 through 849006-8 (2012).
PCT/US2019/017406, International Search Report, dated Jun. 5, 2019.
PCT/US2019/017406, Written Opinion of the International Searching Authority, dated Jun. 5, 2019.

* cited by examiner

*Primary Examiner* — Jonathan M Hansen
(74) *Attorney, Agent, or Firm* — Huse IP Law; Charles C. Huse

(57) ABSTRACT

A beam shaper for an optical inspection tool includes a focal lens to focus an optical beam onto a target at an oblique angle of incidence and a phase modulator to substantially flatten a top of the optical beam in the plane of the target when the optical beam is focused onto the target at the oblique angle of incidence.

15 Claims, 5 Drawing Sheets

INSPECTION-BEAM SHAPING ON A SAMPLE SURFACE AT AN OBLIQUE ANGLE OF INCIDENCE

RELATED APPLICATION

This application claims priority to U.S. Provisional Patent Application No. 62/631,128, filed Feb. 15, 2018, titled "Methods and Systems of Shaping Inspection Beam on a Sample Surface at Oblique Incident Angle," which is hereby incorporated by reference in its entirety for all purposes.

TECHNICAL FIELD

This disclosure relates to optical inspection tools (e.g., for semiconductor inspection), and more specifically to beam shaping in optical inspection tools.

BACKGROUND

Optical inspection tools are used to inspect targets, such as semiconductor wafers, by providing an optical beam, which is also referred to as an illumination beam, that scatters off of the target. The presence of a defect, such as a particle, on the surface of the target within a track illuminated by the optical beam (i.e., within an "inspection track") will affect how the optical beam is scattered, thus allowing detection of the defect. The shape of the optical beam, however, limits the sensitivity of the optical inspection tool. For example, if the optical beam is approximately Gaussian, such that the intensity falls off toward the edges of the inspection track, then this intensity fall-off limits the sensitivity threshold used to detect defects within the track. Alternatively, the beam intensity for the optical tool may have to be increased to achieve the desired sensitivity. Furthermore, the optical beam may have an oblique angle of incidence with the target, such that the angle of incidence is not a right angle (i.e., the optical beam is incident on the target at a slant). When the angle of incidence is oblique, the shape of the optical beam in the plane of the target will differ from the shape of the optical beam in a radial plane.

SUMMARY

Accordingly, there is a need for methods and systems of shaping an optical beam to flatten the top of the beam in the plane of the target, given an oblique angle of incidence for the beam with the target.

In some embodiments, a beam shaper for an optical inspection tool includes a focal lens to focus an optical beam onto a target at an oblique angle of incidence and a phase modulator to substantially flatten a top of the optical beam in the plane of the target when the optical beam is focused onto the target at the oblique angle of incidence.

In some embodiments, a beam-shaping method includes phase-modulating an optical beam and focusing the optical beam onto a target at an oblique angle of incidence. The optical beam as phase-modulated and focused onto the target at the oblique angle of incidence has a substantially flattened top in the plane of the target.

BRIEF DESCRIPTION OF THE DRAWINGS

For a better understanding of the various described implementations, reference should be made to the Detailed Description below, in conjunction with the following drawings, which are not to scale.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
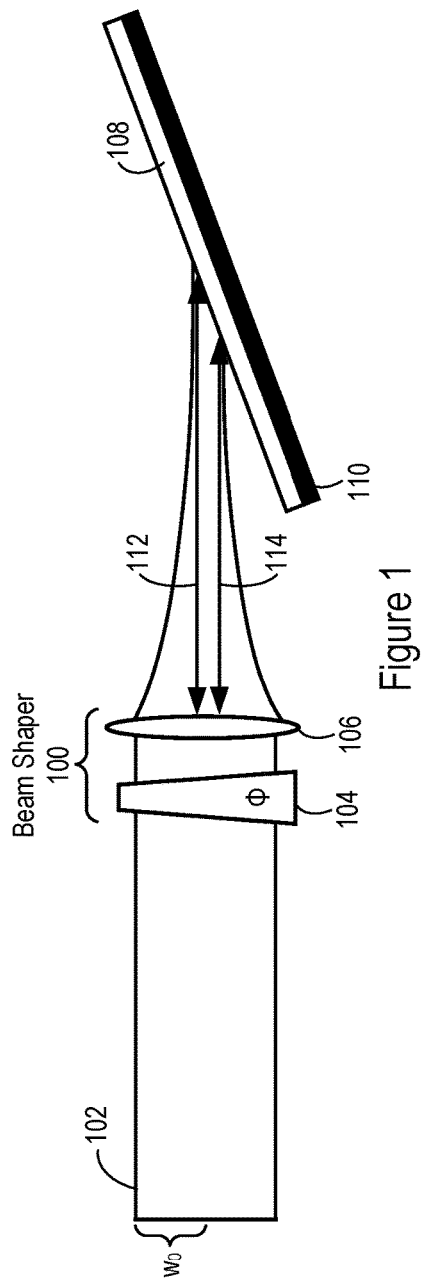
FIG. 1 is a schematic illustration of a beam shaper that shapes an optical beam to substantially flatten the top of the optical beam in the plane of a target in accordance with some embodiments.

FIG. 1 is a schematic illustration of a beam shaper 100 that shapes an optical beam 102 to substantially flatten the top of the optical beam 102 in the plane of (e.g., on the surface of) a target 108 (e.g., a semiconductor wafer) in accordance with some embodiments. The beam shaper 100 is part of an illumination system of an optical inspection tool (e.g., a semiconductor optical inspection tool). The optical beam 102, which has a beam waist with a beam-waist radius $w_0$, is provided by an illumination source (e.g., a laser) in the illumination system. The beam shaper 100 includes a phase modulator 104 (e.g., a phase-modulation plate situated in the path of the optical beam 102) and a focal lens 106. The phase modulator 104 implements a phase-modulation function $\Phi$ and thereby modulates the phase of the optical beam 102. The focal lens 106 focuses the optical beam 102 onto the target 108 at an oblique angle of incidence (as measured from a surface normal for the target 108). The target 108 may be mounted on a chuck 110.

The phase-modulation function $\Phi$ of the phase modulator 104 phase-modulates the optical beam 102 such that the top of the optical beam 102 is substantially flat (e.g., is uniform to within 10 percent) in the plane of the target 108 (e.g., on the surface of the target 108). The beam shaper 100 does not include an intensity modulator and thus does not use intensity modulation to shape the beam, in accordance with some embodiments. By not using intensity modulation, the beam shaper 100 does not degrade the intensity of the optical beam 102, which is desirable for sensitive, photon-hungry applications. This reduction in light loss for the illumination system provides high enclosed energy for the optical beam 102.

In some embodiments, the phase modulator 104 is situated before the focal lens 106, such that the focal lens 106 is situated between the phase modulator 104 and the chuck 110 in an optical path for the optical beam 102. In some embodiments, no optical element is present between the phase modulator 104 and the focal lens 106. The illumination system may include additional optical elements (e.g., an aperture, magnifier, polarizer, lenses, mirrors, etc.) before the phase modulator 104. The illumination system also may include additional optical elements (e.g., one or more mirrors to direct the optical beam 102 to the target 108) after the focal lens 106 (i.e., between the focal lens 106 and the chuck 110).

In some embodiments, the optical beam 102 is substantially Gaussian in shape. For example, the optical beam 102 is dominated by a mode that is substantially Gaussian. A cross-sectional profile (i.e., in a radial direction perpendicular to the optical axis) of the beam intensity thus will resemble a Gaussian (e.g., such that each point in the cross-sectional profile has an intensity that differs from the intensity expected for a Gaussian by no more than ten percent, or no more than five percent).

The propagation of a Gaussian beam in the illumination system can be described by the following equations:

$$P = E_0 \frac{w_0}{w} \frac{e^{ikd}}{\sqrt{i\lambda d}} e^{(iky^2)/2d} \quad (1)$$

$$G = e^{-(y_r^2)/w^2} e^{i\Phi} e^{iky_r^2(\frac{1}{2d} - \frac{1}{2F})} \quad (2)$$

$$F = FFT(G) \quad (3)$$

$$U_t(y) = P \times F\left(f = \frac{y}{\lambda d}\right) \quad (4)$$

$$I_t(y) = |U_t(y)|^2 = \left(E_0 \frac{w_0}{w}\right)^2 \left|F\left(f = \frac{y}{\lambda d}\right)\right|^2 \quad (5)$$

where P is the electric field, w is the beam spot size (i.e., the field spot size), $w_0$ is the beam waist (i.e., the waist spot size), $\lambda$ is the beam wavelength (e.g., the laser wavelength), k is the wave number, $\Phi$ is the phase-modulation function of the phase modulator 104, F is the focal length of the focal lens 106, d is the distance from the focal lens 106 to the target 108, y is the in-plane position on the wafer, $y_r$ is the radial position (i.e., in a plane perpendicular to the optical axis), FFT is a Fast Fourier Transform, and $I_t$ is the beam intensity at the target 108. The phase-modulation function $\Phi$ is chosen so that the optical beam 102 has a substantially flat top in the plane of the target 108.

For an optical beam with normal incidence on a target, as opposed to incidence at an oblique angle, the following solution for the phase-modulation function $\Phi$ produces a substantially flat-top beam assuming sufficient numerical aperture (NA):

$$\alpha = \sqrt{2} \frac{y_r}{w} \quad (6)$$

$$\beta = \frac{2\sqrt{2\pi} \, w w_{FT}}{F\lambda} \quad (7)$$

$$\phi = \beta \times \left[\frac{\pi}{2} \alpha \times \text{erf}(\alpha) + \frac{1}{2} e^{-\alpha^2}\right] \quad (8)$$

where WFT is the width of the flat top, erf is the error function, and all other variables are as defined above for equations 1-5. A phase modulator may be implemented in accordance with equation 8. For example, a rod lens or Powell lens may provide a low-order approximation of a solution to equation 8, an aspherical lens may be designed to provide a higher-order approximation of a solution to equation 8, and a diffractive optical element (DOE) may be designed to provide a discrete realization of a solution to equation 8. The phase-modulation of equation 8 is symmetric about the optical axis.

For an optical beam 102 with an oblique angle of incidence on a target 108, however, symmetric phase modulation results in an asymmetric beam profile in the plane of the target 108. This asymmetry occurs because the optical paths 112 and 114 for the two ends of the top of the beam profile are asymmetric, as shown in FIG. 1. A phase modulator optimized for normal incidence will thus produce an asymmetric beam profile in the plane of target 108 for oblique incidence.

Figure 2:
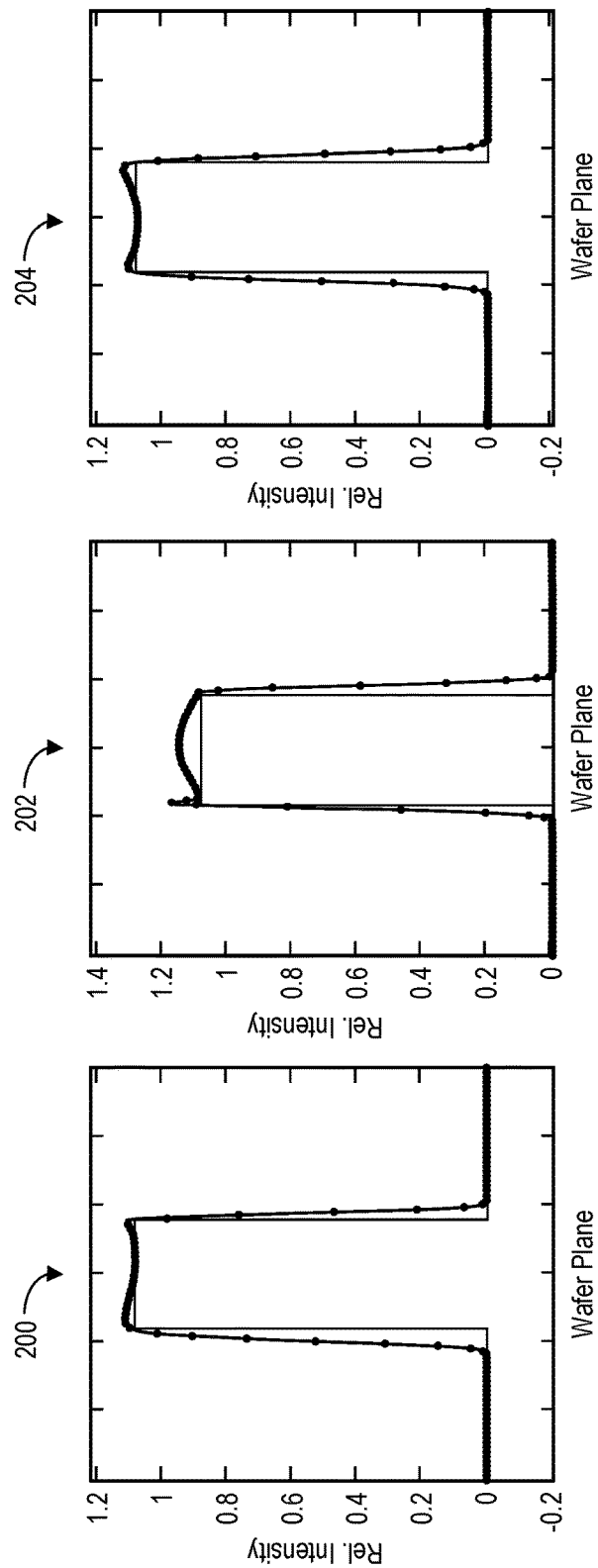
FIG. 2 shows simulated beam profiles produced in the plane of a target using simulations of different examples of the beam shaper of FIG. 1 in accordance with some embodiments.

In some embodiments, asymmetric compensation is provided by positioning the phase modulator 104 (e.g., rod lens, Powell lens, aspherical lens, or symmetric DOE) to be off-center with respect to the optical axis. The asymmetric compensation may be only partially effective, such that some asymmetry remains present in the beam profile. For example, FIG. 2 shows simulated beam profiles 200 and 202 for respective instances of the optical beam 102 in the plane of the target 108, produced using simulations in which the phase modulators 104 are respective symmetric DOEs with off-center alignment (i.e., off-center positioning). (Beam widths may vary for different implementations.) The beam profile 200 is produced by simulation of a beam-shaper 100 in which the phase modulator 104 is a symmetric positive-phased DOE with off-center alignment. The beam profile 202 is produced by simulation of a beam-shaper 100 in which the phase modulator 104 is a symmetric negative-phased DOE with off-center alignment. The tops of the beam profiles 200 and 202 are substantially flat in the wafer plane (or plane of another target 108) and are nearly but not precisely symmetric in that plane.

In other embodiments, an asymmetric DOE is used to compensate (wholly or partially) for the asymmetry between the optical paths 112 and 114 (FIG. 1). The simulated beam profile 204 (FIG. 2) is an example of a beam profile for a respective instance of the optical beam 102, produced using a simulation in which the phase modulator 104 is an asymmetric DOE. To achieve the beam profile 204, the DOE is designed such that its phase-modulation function $\Phi$ includes an asymmetric phase term:

$$\phi = \beta \times \left[c_1 \times \frac{\pi}{2} \alpha \times \text{erf}(\alpha) + c_2 \times \frac{1}{2} e^{-\alpha^2} + c_3 \times e^\alpha\right] \quad (9)$$

where $c_1$, $c_2$, and $c_3$ are coefficients that can be numerically adjusted to improve (e.g., optimize) how flat the beam-top is, the other variables and functions are as defined above, and the $c_3$ term is asymmetric. The asymmetric phase term may take the form of the relevant term in equation 9, of a polynomial approximation thereof, or of another effectively equivalent form.

Figure 3:
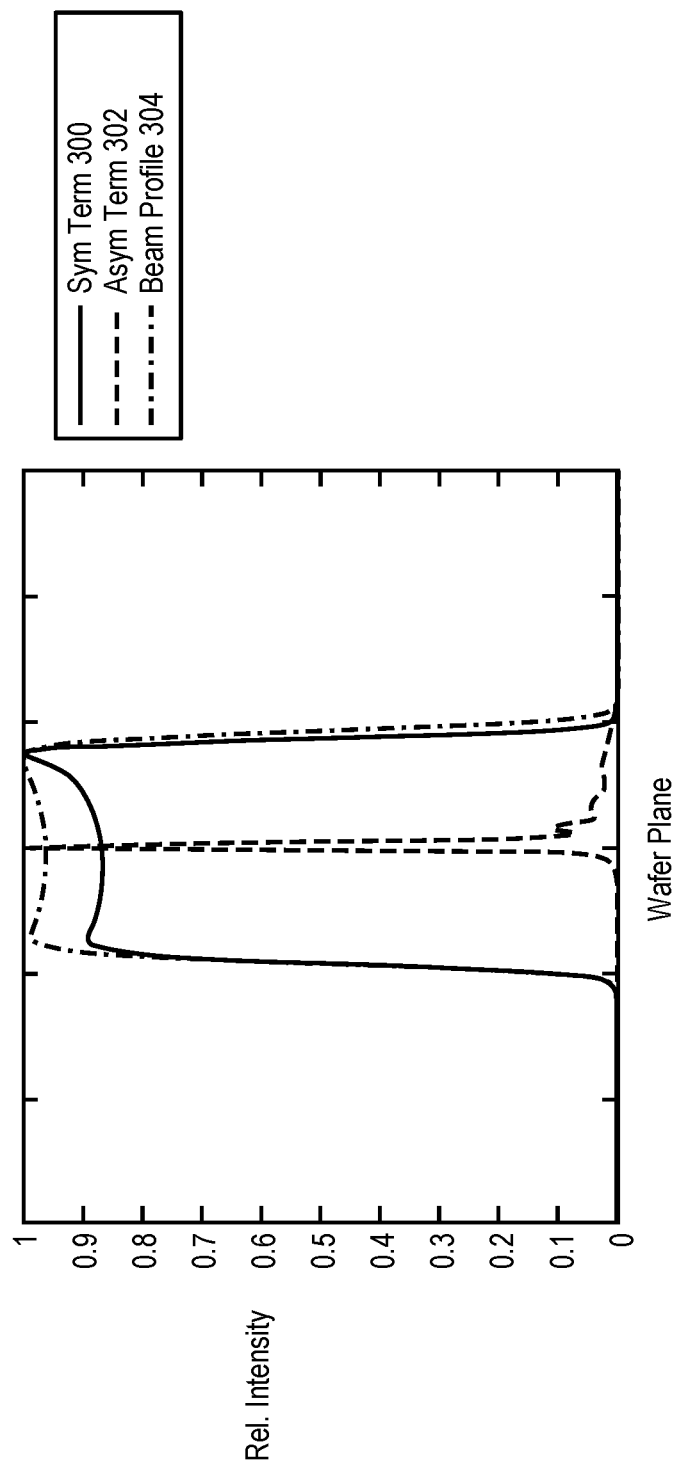
FIG. 3 shows a simulated beam profile in the plane of a target that results from convolution of a symmetrical phase term with an asymmetrical phase term in a diffractive-optical-element (DOE) phase modulator in the beam shaper of FIG. 1, in accordance with some embodiments.

The beam profile of the asymmetric DOE in the plane of the target 108 thus may result from the convolution of a symmetric phase term and an asymmetric phase term:

$$I_t(y) \propto |FFT(G_{symDOE} G_{asymDOE})|^2 = |FFT(G_{symDOE}) \otimes FFT(G_{asymDOE})|^2 \quad (10)$$

where $G_{symDOE}$ corresponds to the symmetric phase term and $G_{asymDOE}$ corresponds to the asymmetric phase term. FIG. 3 illustrates a simulated result of this convolution in accordance with some embodiments: a simulated beam profile 304 in the wafer plane or plane of another target 108 results from the convolution of a symmetric phase term 300 and an asymmetric phase term 304 (where the symmetry and asymmetry of the respective phase terms 300 and 302 are with respect to the optical axis). As FIG. 3 shows, the beam profile 304 in the plane of the target 108 is substantially symmetric (indeed, is almost precisely symmetric) in the plane of the target 108. Accordingly, the DOE may instantiate a convolution of a symmetrical phase term with an asymmetrical phase term to produce a substantially symmetric beam profile in the plane of the target 108 when the optical beam 102 is focused onto the target 108 at an oblique angle of incidence.

Figure 4:
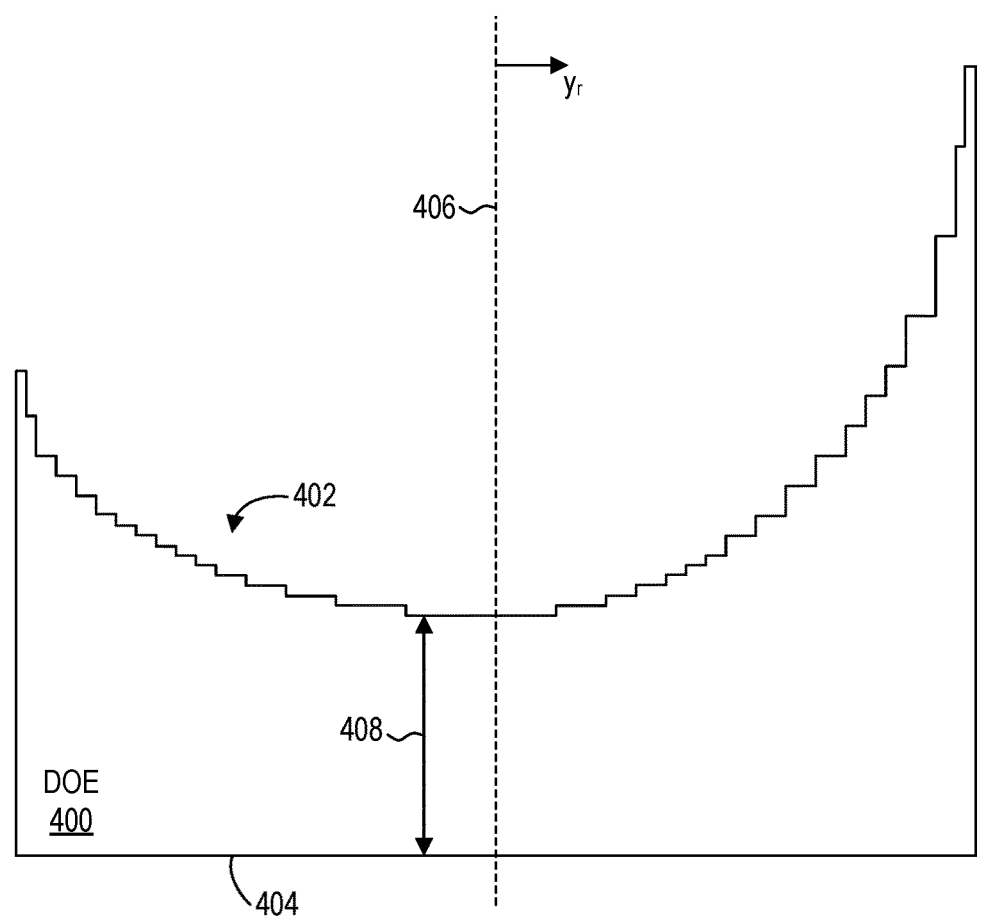
FIG. 4 shows a DOE in which a surface in the path of the optical beam of FIG. 1 is shaped lithographically and thus has steps, in accordance with some embodiments.

A DOE (e.g., an asymmetric DOE) to be used as the phase modulator 104 may be made using a lithography process, such that there are steps in the phase-modulation profile. FIG. 4 shows a DOE 400 in which a surface 402 in the path of the optical beam 102 (FIG. 1) is shaped lithographically and thus has steps, in accordance with some embodiments. The optical axis 406 extends through the DOE 400, intersecting both the surface 402 and an opposite surface 404. In the example of FIG. 4, the optical axis 406 goes through the minimum point on the surface 402 (i.e., the minimum point on the stepped curve of the surface 402).

Figure 6:
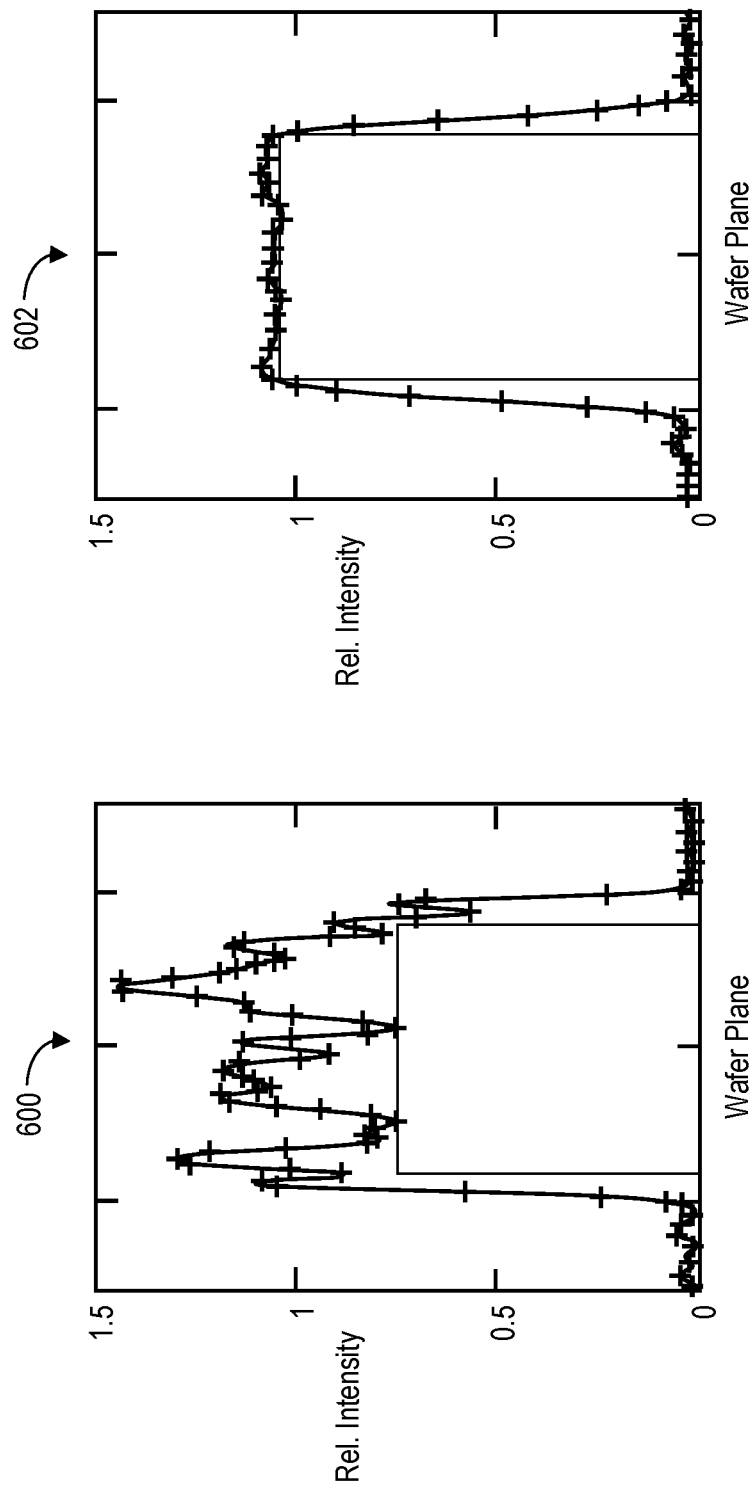
FIG. 6 shows simulated beam profiles produced in the plane of a target using simulations involving DOEs in accordance with some embodiments.

The step size for the DOE 400 may be programmable. The quality of the DOE 400, and the resulting degree of flatness of the top of the optical beam 102, is a function of the step size. A small step size increases the quality of the DOE and thus the flatness of the top of the optical beam 102, but drives up fabrication cost. A step size that is too coarse, however, introduces phase error that degrades the flatness of the beam top. FIG. 6 shows a simulated beam profile 600 for the optical beam 102 in the plane of the target 108 when the step size is π/4. This coarse step size results in the top of the optical beam 102 in the plane of the target 108 having spikes and not being substantially flat, as shown in FIG. 6.

Figure 5:
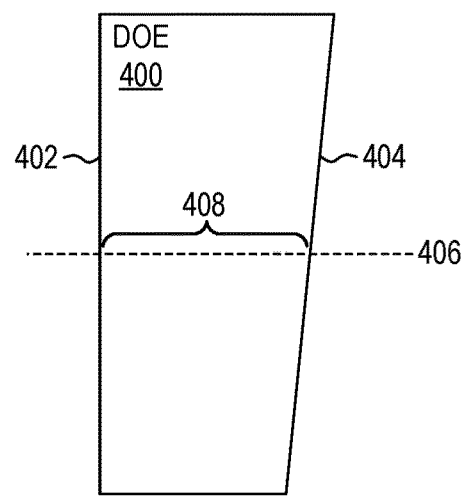
FIG. 5 shows a cross-section of the DOE of FIG. 4 in accordance with some embodiments.

In some embodiments, to mitigate the uneven beam profile that results from a coarse step size for the surface 402, the surface 404 intersects the optical axis 406 at an oblique angle, as shown in FIG. 5 in accordance with some embodiments. FIG. 5 shows a cross-section of the DOE 400 in a plane that in FIG. 4 comes straight out of the page, is parallel to (or coincident with) the optical axis 406, and is perpendicular to the radial axis $y_r$. In some embodiments, each such cross-section of the DOE 400 has the shape shown in FIG. 5. The DOE 400 thus may have a wedge angle in the tangential direction (i.e., the direction of the optical axis 400, which is perpendicular to the radial axis $y_r$) and may have cross-sections that are substantially wedge-shaped (in this example, the cross-sections are not precisely wedge-shaped because they do not come to a point). Respective slices of the DOE in the tangential direction and in a respective plane parallel to (or in) the page for FIG. 4 (and thus perpendicular to a plane of incidence of the optical beam) produce respective beam profiles that combine to smooth out the spikes in the beam profile 600. (FIG. 4 shows an example of such a slice.) The slant of the surface 404 means that the distance 408 between the surfaces 402 and 404 is different for different slices. A resulting simulated beam profile 602 for the optical beam 102 in the plane of the target 108, with a substantially flat top, is shown in FIG. 6. The geometry of FIG. 5 thus allows a flat-top optical beam to be achieved in the plane of the target 108 using a DOE with relatively coarse steps (e.g., a step size of π/4) as the phase modulator 104.

Figure 7:
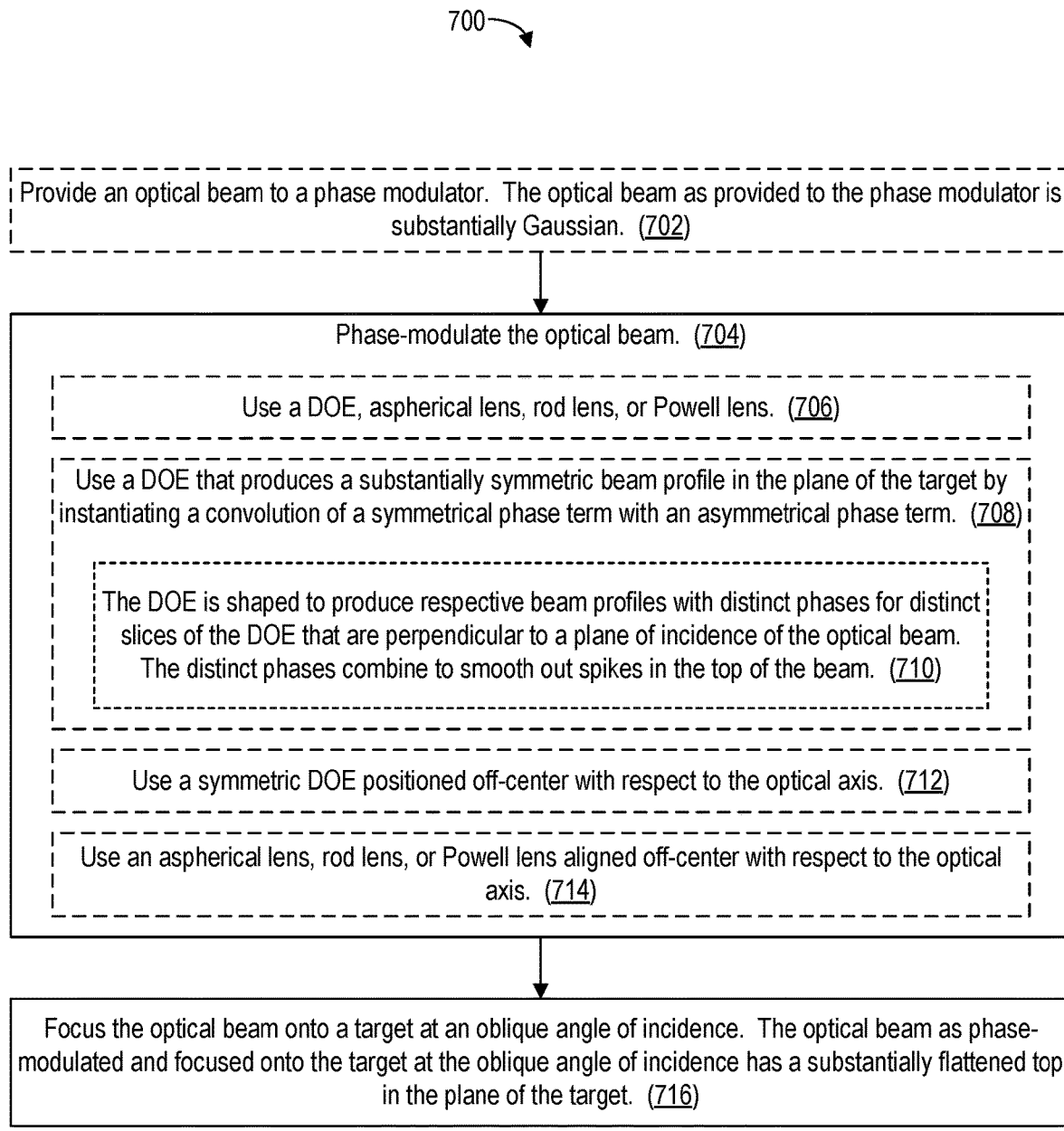
FIG. 7 is a flowchart of a beam-shaping method in accordance with some embodiments.

FIG. 7 is a flowchart of a beam-shaping method 700 in accordance with some embodiments. The method 700 may be performed using the beam shaper 100 (FIG. 1).

In some embodiments of the method 700, an optical beam 102 is provided (702) to a phase modulator 104. The optical beam 102 as provided to the phase modulator 104 may be substantially Gaussian.

The optical beam is phase-modulated (704) (e.g., using the phase modulator 104). In some embodiments, the phase modulation is performed using (706) a DOE, aspherical lens, rod lens, or Powell lens. For example, a DOE is used (708) that produces a substantially symmetric beam profile 304 (FIG. 3) in the plane of the target by instantiating a convolution of a symmetrical phase term 300 with an asymmetrical phase term 302. The DOE may be shaped (710) to produce respective beam profiles with distinct phases for distinct slices of the DOE that are perpendicular to a plane of incidence of the optical beam (e.g., in accordance with FIG. 5). The distinct phases combine to smooth out spikes in the top of the beam.

In another example, the phase modulation is performed using (712) a symmetric DOE positioned off-center with respect to the optical axis. In still other examples, the phase modulation is performed using (714) an aspherical lens, rod lens, or Powell lens aligned off-center with respect to the optical axis.

The optical beam 102 is focused (716) onto a target 108 (e.g., a semiconductor wafer) at an oblique angle of incidence. The optical beam 102 as phase-modulated and focused onto the target 108 at the oblique angle of incidence has a substantially flattened top in the plane of (e.g., on the surface of) the target 108.

Steps in the method 700 that are not order-dependent may be reordered.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A beam shaper for an optical inspection tool, comprising:
    a focal lens to focus an optical beam onto a target at an oblique angle of incidence; and
    a phase modulator to substantially flatten a top of the optical beam in the plane of the target when the optical beam is focused onto the target at the oblique angle of incidence, the phase modulator comprising a diffractive optical element (DOE) that instantiates a convolution of a symmetrical phase term with an asymmetrical phase term to produce a substantially symmetric beam profile in the plane of the target when the optical beam is focused onto the target at the oblique angle of incidence.

2. The beam shaper of claim 1, further comprising a chuck on which the target is to be mounted, wherein the focal lens is situated between the phase modulator and the chuck in an optical path for the optical beam.

3. The beam shaper of claim 2, wherein the optical beam as incident upon the phase modulator is substantially Gaussian.

4. The beam shaper of claim 2, wherein no optical element is present between the phase modulator and the focal lens.

5. The beam shaper of claim 1, wherein the phase modulator is configured to flatten the top of the optical beam such that the intensity of the optical beam across a width corresponding to an inspection track varies by no more than 10 percent in the plane of the target when the optical beam is focused onto the target at the oblique angle of incidence.

6. The beam shaper of claim 1, wherein cross-sections of the DOE that are perpendicular to a radial axis of the optical beam are substantially wedge-shaped.

7. The beam shaper of claim 1, wherein the DOE is shaped to produce respective beam profiles with distinct phases for distinct slices of the DOE, the distinct slices being perpendicular to a plane of incidence of the optical beam, wherein combination of the distinct phases smooths out spikes in the top of the beam.

8. The beam shaper of claim 1, wherein:
the target is a semiconductor wafer; and
the phase modulator is configured to substantially flatten the top of the optical beam in a plane corresponding to a surface of the semiconductor wafer onto which the optical beam is focused.

9. A beam shaper for an optical inspection tool, comprising:
a focal lens to focus an optical beam onto a target at an oblique angle of incidence;
a diffractive optical element (DOE) to substantially flatten a top of the optical beam in the plane of the target when the optical beam is focused onto the target at the oblique angle of incidence, wherein the DOE instantiates a convolution of a symmetrical phase term with an asymmetrical phase term to produce a substantially symmetric beam profile in the plane of the target; and
a chuck on which the target is to be mounted, wherein:
the focal lens is situated between the DOE and the chuck in an optical path for the optical beam;
the optical beam incident upon the DOE is substantially Gaussian; and
cross-sections of the DOE that are perpendicular to a radial axis of the optical beam are substantially wedge-shaped.

10. A beam-shaping method, comprising:
phase-modulating an optical beam using a diffractive optical element (DOE) that produces a substantially symmetric beam profile in the plane of the target by instantiating a convolution of a symmetrical phase term with an asymmetrical phase term; and
focusing the optical beam onto a target at an oblique angle of incidence;
wherein the optical beam as phase-modulated and focused onto the target at the oblique angle of incidence has a substantially flattened top in the plane of the target.

11. The method of claim 10, wherein:
the phase-modulating is performed before the focusing, using the DOE; and
the method further comprises providing the optical beam to the DOE, wherein the optical beam as provided to the DOE is substantially Gaussian.

12. The method of claim 10, wherein:
the DOE is shaped to produce respective beam profiles with distinct phases for distinct slices of the DOE, the distinct slices being perpendicular to a plane of incidence of the optical beam; and
the distinct phases combine to smooth out spikes in the top of the beam.

13. A beam shaper for an optical inspection tool, comprising:
a focal lens to focus an optical beam onto a target at an oblique angle of incidence; and
a phase modulator, positioned off-center with respect to the optical axis, to substantially flatten a top of the optical beam in the plane of the target when the optical beam is focused onto the target at the oblique angle of incidence;
wherein the phase modulator comprises an element selected from the group consisting of an aspherical lens, a rod lens, and a Powell lens.

14. The beam shaper of claim 13, wherein the element is the aspherical lens.

15. The beam shaper of claim 13, wherein the element is the rod lens or the Powell lens.

* * * * *